Feb. 10, 1942.   F. HOTCHNER   2,272,945
LUMINOUS DISPLAY WITH AN EFFECT OF MOTION
Filed Sept. 27, 1939   3 Sheets-Sheet 1
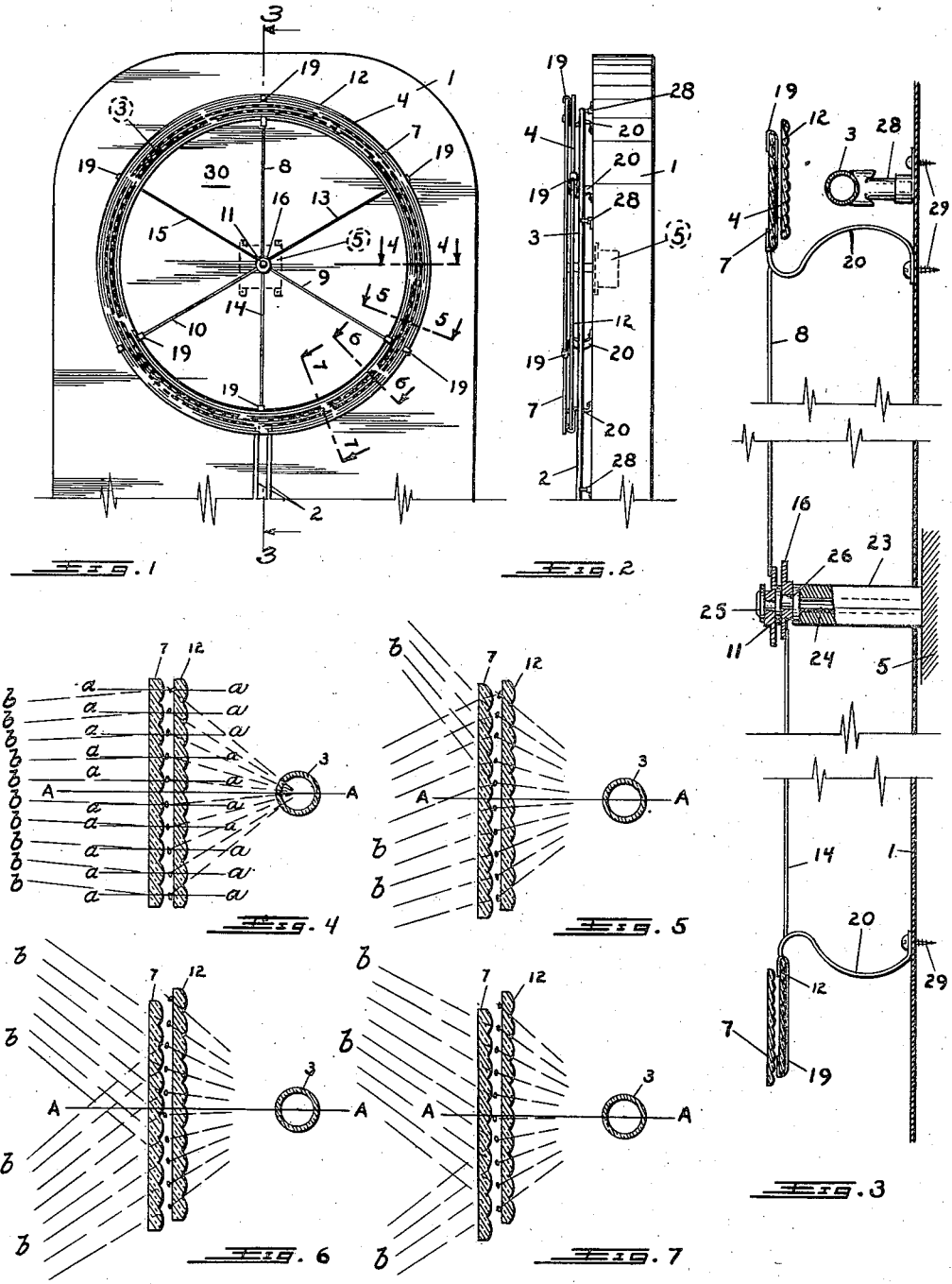
INVENTOR
Fred Hotchner Feb. 10, 1942. F. HOTCHNER 2,272,945
LUMINOUS DISPLAY WITH AN EFFECT OF MOTION
Filed Sept. 27, 1939 3 Sheets-Sheet 2
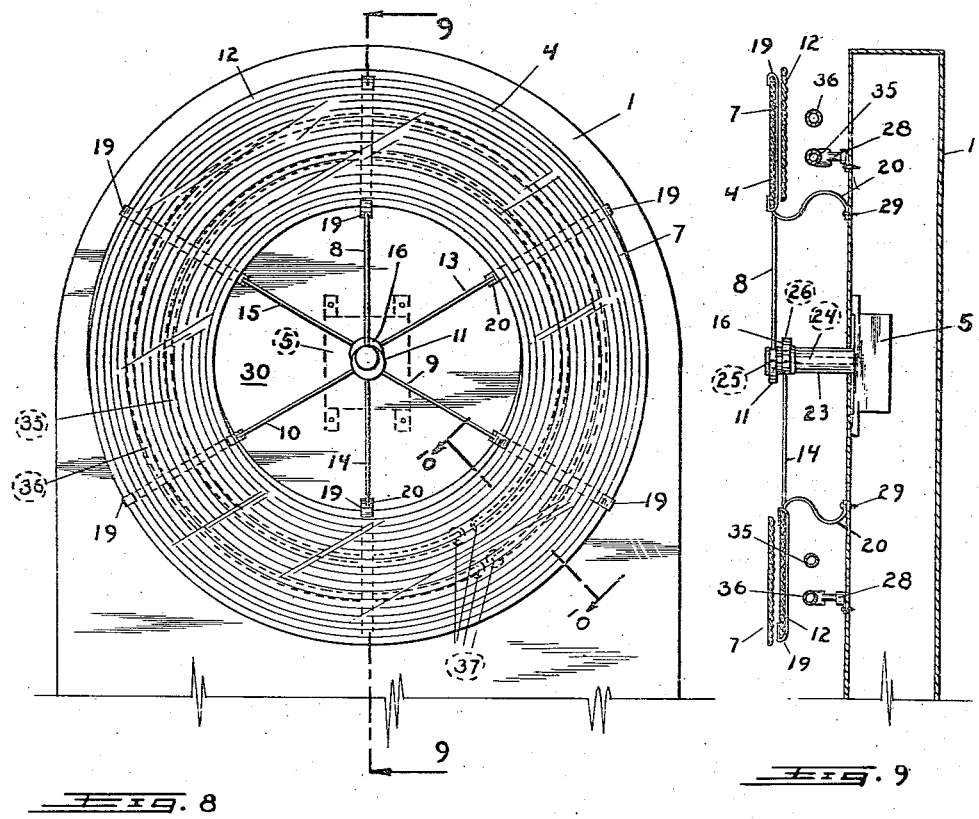
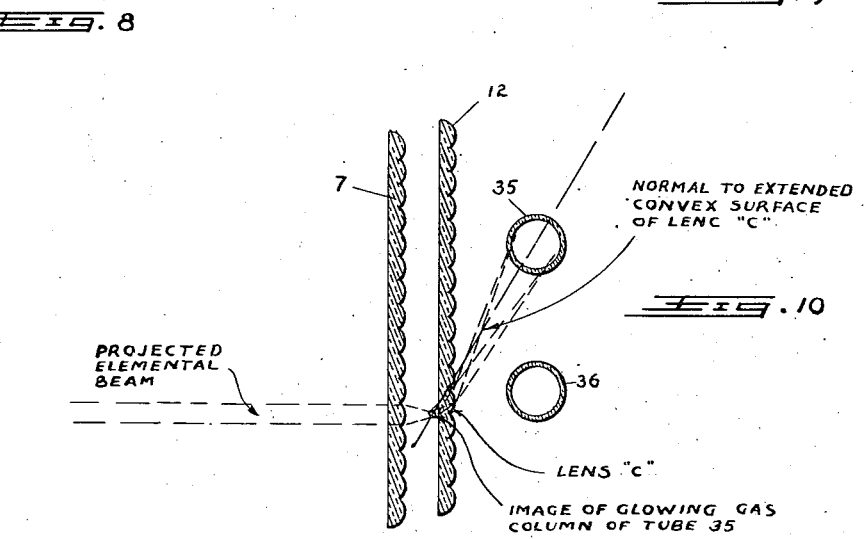
INVENTOR
Fred Hotchner Feb. 10, 1942.   F. HOTCHNER   2,272,945
LUMINOUS DISPLAY WITH AN EFFECT OF MOTION
Filed Sept. 27, 1939   3 Sheets-Sheet 3
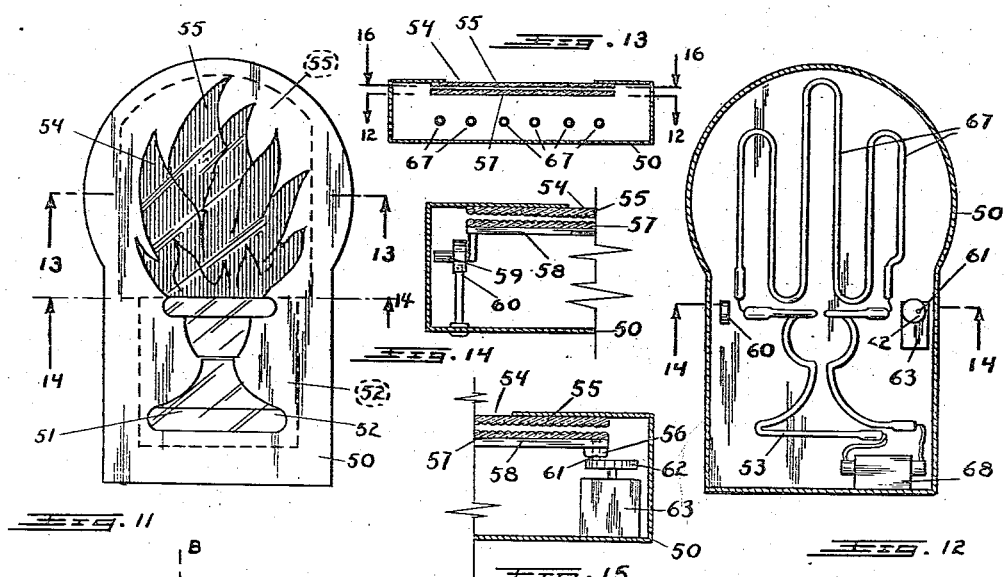
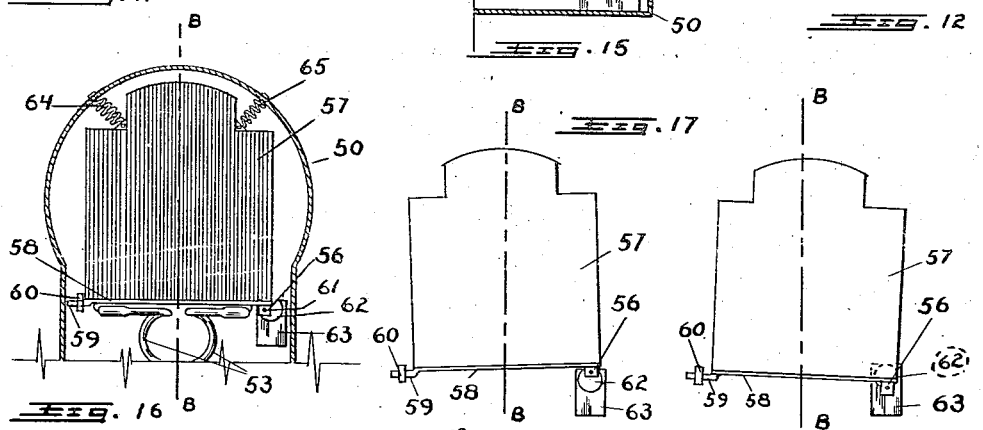
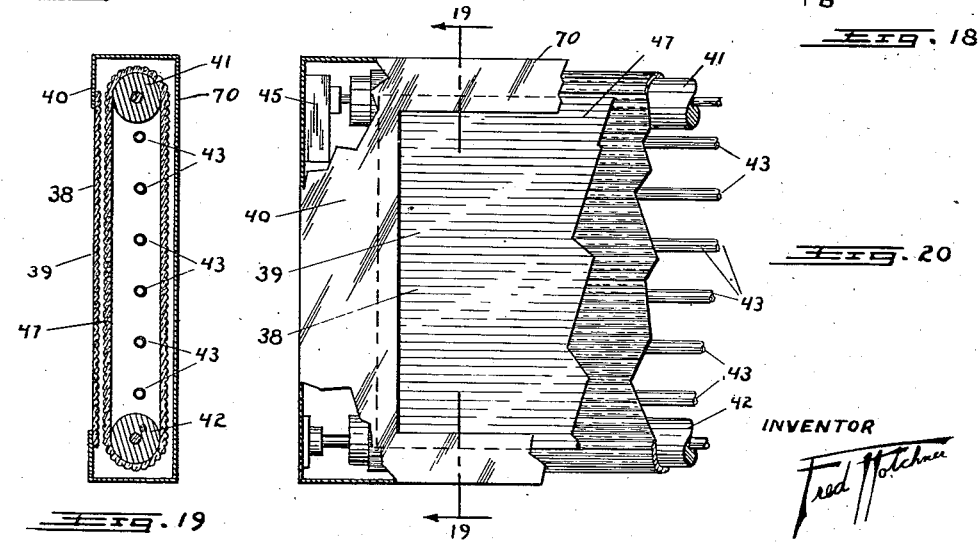
INVENTOR
Fred Hotchner Patented Feb. 10, 1942

2,272,945

UNITED STATES PATENT OFFICE 2,272,945

LUMINOUS DISPLAY WITH AN EFFECT OF MOTION

Fred Hotchner, Los Angeles, Calif.

Application September 27, 1939, Serial No. 296,792

6 Claims. (Cl. 40—130)

This invention relates to a luminous display with an effect of motion and the object thereof is to produce, by simple, low cost apparatus of high reliability, various illusory effects of motion which are realistic, striking in attention value, very brilliant and distinguishable at long distances. In general the invention is adapted to the use of elongated illuminants, typically gaseous conduction lighting tubes, whereby high intrinsic brilliance may be present in confined spaces. However it is not so limited, but may be applied in connection with various types of light sources and luminous objects.

The effects secured are developed by means of refracting members assembled in pairs, one in front of the other, in front of the illuminants. It is an object to develop illusions of animation by the most direct possible projection of light from the source to the observer to minimize losses and permit of the use of high densities of light flux. It is a further object to produce effects in which the illumination consists of beams originating at the various areas of the display surface to appear bright to the observer at any particular point of view and instant of time. This new and novel type of pictorial lighting in animation differs from methods of the prior art in the same manner as directed flood or search light illumination differs from illumination by a diffusive source, and makes for extremely brilliant effects and high efficiency.

A further object in this connection is to produce animation effects by sweeping the field of view with such beams in such order that for each of many points of view the same sequence of beam coverage from the various areas of the display surface occurs although at different time phase. Thus the areas which appear dark from certain points of view appear bright from other points of view, none of the light being blocked to produce the dark and light regions but rather diverted from one part of the field of view to another. Substantially all of the light projected being thus effective.

A further object of the invention is to produce a very considerable apparent movement in the animation effect from a very inconsiderable mechanical movement of elements and further to produce the effect by the use of parts so light that the simplest of mechanisms and lightest of motors suffice to drive them.

It is a further object of this invention to provide a very simple means of condensing radiation from elongated illuminants into beams of narrow divergence crosswise of the illuminants and to do so in the collection of very considerable proportion of the total radiation developed. By the use of such beams, which may be made to follow the outlines of inscription lights, display effects may be made attractive and clearly distinguishable at distances far in excess of those at which exposed illuminants are effective. Further by the movement of such beams to cover wide fields of view the display patterns are visible for short periods of time at high brilliance, producing net attraction effects far greater than that attainable by steadily observable displays of ordinary brilliance. The principle here involved is an application of that of helioscopic signaling in which small amounts of light flux in beams of zero or narrow divergence are distinguishable for many miles.

The invention bears certain similarities to that disclosed in my copending application, Serial No. 291,188, filed August 21, 1939, in which animation effects are produced by a single refracting element moved in front of an elongated illuminant. As regards that invention, this invention provides further among its objects to produce effects crosswise of the illuminant over areas which may be many times the width of the illuminant. By the use of grids of illuminants and suitably constructed refractor elements effects may be produced here according over areas of any size, at any desired speed or direction and with substantially no limitation to the light intensity which may be transmitted through the devices.

It is a further object hereof to produce multicolor effects in which complete color changes may be effected in given sections of the display surface even to the extent of making a color from an adjacent tube appear to direct view immediately over a tube of contrasting color.

It is a further object of the invention to produce various special effects exemplified by specific examples below in which combinations of different kinds of movements in the illusions are used in simulation of natural movements.

Various other objects of the invention will be apparent from the following specification taken in connection with the drawings. The invention may be practiced in various combinations of its features or in its new principles by other mechanisms than those shown within the scope of the claims. The claims therefore are to be read broadly within the limitations imposed by the prior art. The invention may be practiced in its broadly new features and in its methods in arts other than those of display. Thus, I contempla.: herein the use of this invention in connection with general illumination, signal, vehicle headlight and other uses in which beam directional control is useful.

The invention is illustrated in its preferred embodiments in the accompanying drawings in wihch the same reference numeral appearing in several views is used to indicate the same or the equivalent part throughout.

Figure 1 is a front elevation of a section of an electric sign provided with my invention to produce a whirling border effect along the course of a circular gaseous conduction lighting tube. Figure 2 is a side elevation of the same. Figure 3 is an enlarged fragmentary cross section of the animation device taken as indicated by the section line 3—3 in Figure 1.

Figures 4 to 7 inclusive are diagrammatic cross sections of the refracting rings and lighting tube showing a series of successive conditions at a single position on the ring, or successively the conditions at the positions indicated by the section lines 4—4, 5—5, 6—6 and 7—7 in Figure 1.

Figure 8 is a front elevation of an electric sign provided with a whirling border effect device in which two lighting tubes of contrasting color produce a double color effect in the whirling border. Figure 9 is a cross section of the same taken as indicated by the section line 9—9 in Figure 8. Figure 10 is a diagrammatic cross section of the refracting ring and tube, illustrating the complete change of color effect in front of the tubes, taken as indicated by the section line 10—10 in Figure 8.

In the devices above enumerated the effect produced is a combination of what I describe as transverse and longitudinal components in the light refraction. In the device illustrated in Figures 11 to 18 inclusive the longitudinal component dominates the effect, while in the device illustrated in Figures 19 and 20 the transverse component alone is involved.

Figure 11 is a front elevation of an internally lighted sign in which a flame effect is produced by reciprocating lenticular refracting members relative to each other in front of luminous tubes to produce the effect of motion lengthwise of the tubes with a peculiar flaring action described below.

Figure 13 is a cross section of the same taken as indicated by the section line 13—13 in Figure 11. Figure 12 is a front elevation of the device with the face and the movable refracting element removed exposing the luminous tubes, transformer and motor, and corresponding to the section line 12—12 in Figure 13. Figures 14 and 15 are fragmentary cross sections, enlarged, taken as indicated by the section line 14—14 in Figure 11 and showing the driving mechanism. Figure 16 is a front view of the main elements of the device as seen along the section line 16—16 in Figure 13.

Figures 17 and 18 are diagrammatic illustrations of the movement of the movable refracting element to show the manner in which the effect is produced.

Figure 20 is a front elevation of an electric sign with various portions removed to expose other portions in which an effect of animation crosswise of a bank of tubes is produced by means of a moving belt having refracting formations. Figure 19 is a cross section of the same taken as indicated by the section line 19—19 in Figure 20.

In Figures 1 to 3 a section of an electric sign is shown typical of the embodiment of certain forms of the invention. A section of a sign body, indicated by numeral 1, has mounted on a surface an assemblage of gaseous conduction tubing and animation means in front of the tube portion to be animated. The tube 2 is continuous with other display inscriptions on the sign section not shown in the view, only that portion of the tube indicated by numeral 3, and represented by dotted lines in Figure 1, being involved in the animation effect. As shown by the side elevation in Figure 2 and in more detail by Figure 3, the tube and the animation device are associated optically but not by direct mechanical connection, thus providing for simplicity and flexibility in the adaptation of the principles herein disclosed to various types of displays.

The animation device, indicated generally by numeral 4, includes a pair of lenticulated ring members positioned one in front of the other in front of the tube portion 3, a driving motor 5 together with eccentric mechanism and connections to the ring members, and spring spacing and mounting members associating the ring members with the sign body and maintaining the predetermined spacings of the same. The particular arrangement shown is to be understood as illustrative of the function to be served, as numerous other mechanical arrangements will also perform this function satisfactorily. In particular it is to be noted that by the construction shown the neon tube may be constructed on the sign body in the usual fashion and be continuous with other display matter and the animation unit positioned over it without involving any change in or connection to the high voltage wiring.

The forward one of the ring members 7 is carried by the wire spokes 8, 9 and 10 extending from the concentric hub 11. Similarly, the rearward of the ring members 12 is carried by the spokes 13, 14 and 15, extending from the concentric hub 16. The ring members may be of any suitable transparent refracting medium such as glass or cellulose acetate. A suitable detail of assemblage is shown in Figure 3, in which it will be seen that the ring members are embraced by flat metal clamps 19, 19, etc., which are spot welded to the flat springs 20, 20, etc., and the spokes spot welded to the springs.

The driving motor is mounted to the rear of the sign face and is provided with a shaft extending through the bushing 23 to the level of the ring members. The shaft 24 terminates in the eccentric throws 25 and 26, displaced 180° from each other, which drive the hubs. The rings are thus shifted eccentric of each other for purposes which will be explained below. It will be obvious that the same purposes may be served by one ring remaining stationary while the other is shifted in an eccentric path with relation to it. By the construction shown the amount of movement of each ring is reduced and a more symmetric relationship is maintained with the tube, simplicity of detail being attained as well. These images, shown as solid images in space in the diagrams because of the depth of the source, will vary in spacing between the two refractors to a degree depending on the optical factors of each case. Generally they will fall close enough to uniform spacing for all practical purposes, but for purposes of clarity in the views, the variation in distances from the refractors has been exaggerated.

The lighting tube is mounted from the sign body by means of insulating posts 28, and connected in the usual manner to a high voltage transformer which is not shown. The tube is out of contact with the springs which are secured to the sign body by sheet metal screws 29. The springs are formed to maintain a slight pressure on the spokes away from the center of the device. The spokes preferably should be of very light wire to leave the space 30 in the center of the device clear for such painted or tube lighted copy as may be desired.

The lenses of the ring members are of the "cylindrical" type, preferably semi-circular in cross section as shown in Figures 4 to 7 and 10. They are assembled or fabricated in bank formation with the long dimension or axis of refraction extending in the general direction of the illuminant. The lenses of the rearward one of the rings project a bank of images of the tube into the space between the rings. The lenses of the forward one of the rings being focused on these images, project from them a group of beams to the field of view, the direction of which depends on the relative positions of the rings.

As otherwise expressed, the lenses of each of the two rings combine individually with individual lenses of the other ring and the illuminant to form elemental optical systems projective of beams which are narrow crosswise of the illuminant and long lengthwise therewith. The direction of these beams changes as the rings are shifted and the lens grouping changes. The beams combine in groups to form compound beams which are also of narrow section.

Inasmuch as other lens sections than that shown in the drawings may be made to serve this same purpose, I use the term "lens" in the broad sense of including any refracting formation functioning as the lenses of these drawings, and the term "axis of refraction" in the generic sense of including the cylindrical axis of an elongated lens having a cylindrical surface extending in the general direction of the corresponding illuminant, and also including the equivalent reference axis of any other kind of refracting element similarly producing a beam of narrow divergence crosswise of the illuminant.

The animation effect produced by this device may be treated as divided into two components, one transverse of the tube and associated ring sections, and the other longitudinal therewith. The transverse component is illustrated in the cross sections of Figures 4 to 7 which are to be understood as generalized diagrams inasmuch as distortions of scale have been resorted to in order to clarify the principle involved.

In Figure 4 the lenses of the two rings are in registry so that a series of parallel lines $a$—$a$ parallel to the normal through the tube A—A will pass through the centers of curvature of the lenses of both rings. Assuming for the sake of this illustration that the curvature of the lenses and the index of refraction of the material are such that the images of the tube produced by the inner ring 12 will all fall between the rings, we will draw the chief rays from the tube center through the lenses to their centers of curvature. In all practical cases these images will fall beyond the center of curvature which would mean that the images above the normal A—A will be above the corresponding parallels, and those below the normal A—A will be below the corresponding parallels. Allowance of course, is to be made for the varying image distance from the lenses due to the varying source distance and the varying angles. Further allowance is to be made for the shielding of the lenses by each other at the more acute angles with the corresponding distortion of the images. These factors are however, minor. All conditions considered, it is found in the practical construction that the images, now regarded as sources of light for the lenses of the front ring 7, are displaced upward and downward away from the normal A—A.

Chief rays, indicated by $b$, $b$, etc., may now be drawn from these images, through the centers of curvature of the lenses of the front ring. It will be found that a beam composed of a number of elemental beams converging toward A—A is projected forward and that other beams at the top and bottom of the assemblage are also formed projected angularly away from A—A. These secondary beams arise from combinations between lenses of the two rings at extreme angles in Figure 4. Being insignificant in effect in the condition of Figure 4, the first angular beam group is shown at the top of Figure 5. As the rings are shifted through the positions shown in Figures 5, 6 and 7, the beams sweep across the field of view. The major beam group of Figure 4 is seen disappearing in the condition of a secondary beam at the bottom of Figure 7 as the rings move toward a position equivalent to that of Figure 4. But for the convergence of the beams a bright flash would be seen by an observer in front of the display only at the instant that the lenses are in direct alignment with his eyes and the tube. The flash would be seen for only a very short instant and only in front of the tube. Due to the convergence of the beams however, he will observe action over a very considerable width of the ring.

The final position of the lenses in the movement shown will be as shown at the bottom of Figure 3, the rings will thereafter move in the opposite direction relative to each other back to the position shown in Figure 4. The longitudinal component of the action will be apparent by considering Figure 4 as a cross section taken at the section line 4—4 in Figure 1, and correspondingly, Figures 5, 6 and 7 as cross sections taken as indicated by the section lines 5—5, 6—6 and 7—7. An observer in the normal field of view will be reached by beams from successive portions of the rings and thus observe bright areas moving around the design. There is thus a movement in effect both across and lengthwise with the ring, which effect will be substantially the same over a considerable field of view. From extreme positions laterally of the ordinary positions of view certain distortions will enter the effect due to the normal spacings of the parts and the inaccuracies of construction. In general, however, the whirling circle effect produced by this device, constructed with ordinary care, will be distinct from all angles from which displays are ordinarily expected to be effective.

The lenses of the two rings thus combine in elemental optical systems with the illuminant to project beams of narrow divergence crosswise of the longest dimension of the illuminant, these elemental beams being combined into compound beams, also of narrow divergence crosswise of the illuminant. Preferably the lenses are of the "cylindrical" type, the cylindrical axes following in general the longest dimension of the corresponding illuminant. Inasmuch as other sections are also suitable for this purpose I use the expression "axis of refraction" in the claims in the generic sense of including the cylindrical axis of an elongated lens having a cylindrical surface extending in the general direction of the corresponding illuminant, and also including the equivalent reference axis of any other refracting element similarly producing a beam of narrow divergence crosswise of the illuminant.

In Figure 8 I show a front elevation of a modified form of the invention in which two concentric tubes of circular outline of contrasting color are used, being indicated by dotted lines in the view. The tubes 35 and 36 terminate at electrodes indicated by 37 in Figure 18, and are seen in the cross section of Figure 9. The remaining details are similar to those of the device of the previous views, the rings however being wider in the instant case.

The cross section of Figure 10 illustrates the light distribution for the position indicated by the section line 10—10 of Figure 8 at which point the observer directly in front of the display will see the color of tube 35 in front of the position of tube 36. Thus is illustrated the complete color change effect achieved by this device and capable of numerous modifications in the production of spectacular effects.

In Figure 19 I show a cross section and in Figure 20 a portion of the front view of a display in which a continuous traveling effect is produced across a display surface according to the transverse effect illustrated in Figures 4 to 7. In these views a sign box 70 is provided with a lenticular sheet member 38, having parallel lenticulations, exposed through an opening 39 in the front wall 40. A pair of rollers 41 and 42 are disposed at the top and bottom of the box and carry a belt 47 of transparent sheet lenticulated material, the lenticulations being parallel to each other and those of the front sheet. A grid of gaseous conduction lighting tubes 43 is positioned backward of the forward run of the belt, the spacing of the tubes with relation to the belt and the front sheet being similar to that illustrated in Figures 4 to 7, and the tubes being spaced from each other just sufficient to avoid the effects of adjacent tubes over-running each other. The belt is turned by means of a motor 45. A traveling effect is produced to view across the face of the display in the direction of the belt movement but at a considerably higher speed consisting of a number of bright bands of light parallel with the lenticulations moving transverse thereof. By slanting the lenticulations relative to each other a cross component may be added to the action. By providing suitable stencils in front of the front sheet various character or pictorial effects may be produced.

In Figure 11 I show a front elevation of an electric display in which the effect of a flame is produced in a fire pot. The sign body 50 has a cut-out 51 representing the outline of the fire pot behind which is secured the glass 52 suitably finished to represent the details of the pot. The lighting tube 53 in the general outline of the pot is positioned behind this cut-out to light it. An additional cut-out 54 is backed by the lenticulated glass 55. This glass is smooth on the front surface and may be finished to represent details of a flame, care being taken to avoid rendering this surface light diffusive to such a degree as to interfere with the effect. Transparent colors should be used for this purpose, although a small amount of pigment body may be permitted in order to improve the day effect.

Behind the glass 55 and parallel thereto is mounted a movable glass 57, also lenticulated, and disposed to be shifted in a plane parallel to the cover glass. The bottom of the glass is supported by a cross bar 58 which has a sliding extension 59 reciprocatingly held in the swivel bearing 60. The opposite end of the bar has a bearing 56 which turns on the stud 61 on the crank 62 driven by the motor 63. The upper edge of the glass is held by two springs 64 and 65 which are strung to the sides of the body as shown in Figure 16. This glass member has been removed to show the tube grid 67 underneath it in Figure 12. In this view the transformer 68 is shown supplying current to both tubes which are connected together in series. The details of the drive are more clearly shown in Figures 14 and 15, it being understood that strict proportioning has not been observed in these views in consideration of the necessity of clarity. In each particular application of the principles illustrated herein the contour of the lenses, pitch and spacing of the members and spacing with relation to the tubing must be determined by the conditions of the case.

In Figure 16 the movable glass is shown in the position it occupies when the crank stud is in the extreme left position. As stud revolves clockwise 90° to the upright position the right side of the glass is lifted upward and the whole glass shifted to the right to the position shown diagrammatically in Figure 17. In this position the lenticulations are crossing each other angularly, producing an upward component in the effect. Whether any, and how much transverse effect is present will depend on the relative pitch of the lenticulations on the two sheets. For a realistic flame effect a certain amount of side action is not only allowable but quite in order.

The action will be rapid at the beginning of this movement and slowest at the position shown in Figure 17. The number of bright areas appearing to view will depend on the number of crossing of the lenticulations in this position, or in other words, will be a function of the pitch of the lenticulations and the maximum angle of the sheets to each other. This angle is that made by the lenticulations with the vertical reference line B—B assuming the lenticulations of the front sheet to be vertical.

A further movement of 90° brings the movable sheet to a position opposite that shown in Figure 16 with the lenticulations parallel. As this position is approached the action flares up rapidly again and there is then a pause as the stud passes the horizontal line and the action flares up once more and slows down to the position shown in Figure 18 on the return movement. The effect is thus a combination of vertical traveling, intermittent flaring and such reciprocating transverse movement as may be introduced by the spacing and formation of the lenses. To produce a convincing flame effect, or for that matter, any natural movement such as a flag waving, etc., it is necessary in each case to make a number of empiric tests to develop the proper illusion.

According to this invention very intense effects may be produced due to the fact that there is no practical limit to the intensity of gaseous conduction lighting tubes. As much light as desired may be generated without involving any corresponding change in the construction or operation of the device. An extremely high utilization of the light developed is attained due to the fact that the entire sector of rays of the tubes which is intercepted by the refractors is directed forward into the normal field of view, or at the most, with but a very small percentage of light scattered into non-useful directions. If suitable reflectors be applied behind the lights to direct forward the corresponding backwardly radiated sectors of rays, utilizations factors of from 75 to 90 percent can be attained, which is attained by only the very best commercial illuminating devices of any type. It is particularly to be noted, that in the event illuminants be used which generate heat, ventilation may be provided without any interference from or to the refracting system.

The refractors may be constructed of glass or of any other suitable material such as vinyl chloride, cellulose acetate, methyl methacrylate, or any other of the commercial plastics. By the judicious selection of plastic sheeting of suitable physical characteristics the lenticulations may be reduced in pitch and the sheeting in thickness until the stretch of the material and expansion and contraction as compared to the pitch distance of the lenses becomes the limiting factor. The movement necessary to produce a given effect decreases directly with the lenticulation pitch and consequently the cost of the device, even when constructed in quite large models, may be very moderate and but a very small fraction of that of devices constructed by any known prior art method.

Various types of lights may be used, the invention not necessarily being limited to elongated illuminants except where specifically so claimed. The term "illuminant" is used in the broad sense in the claims as embracing any type of primary light source and any object or surface rendered luminous by any means and functioning as described.

It is to be noted that for any given point of view, an area on the display from which one of the elemental beams is projected to that point will appear bright to an observer so positioned. If the beam diverges then the effect will be to increase the points from which the corresponding display area will be seen as bright. The same may be said as regards the compound beams. Likewise if the beam under consideration converges, it may be considered as a divergent beam from a focal point forward of the display, which focal point being in direct line with the observer may be concealed out of the consideration and the beam regarded as originally divergent. The term "beam" as used in the claims may therefore be treated as embracing any bundle of light rays whether parallel, convergent or divergent.

The terms of the claims are to be broadly construed as embracing all substantial equivalents thereof.

The term "field of view" is used to describe the area over which the display is ordinarily expected to be clearly distinguished. The sweep of the beams is preferably, but not necessarily, confined to this area.

The term "refractor" is used broadly in the claims to embrace any type of refracting member functioning as described, prismatic, lenticular or otherwise, and constructed from one or any plurality of elements.

The term "design" is used in the claims to embrace any design or inscription, symbol, character, ornamental outlining, border, etc.

The term "relative to each other" is used in the claims in describing the movement of the refractors to embrace the movement of one refractor with the other stationary as well as both refractors together relative to each other.

The term "coextensive" as used in the claims is to be understood in the broad sense of describing the elements so designated as extending in the same general direction, either one extending the whole or any part of the distance covered by the other.

Having thus described my invention, what I claim is:

1. The combination of an illuminant elongated at least partially in the form of a circuitous design with a pair of refractors positioned one in front of the other in front of said illuminant and having each a plurality of refracting formations extending generally in the direction of said illuminant and spaced and contoured so that they combine optically to project beams of narrow divergence crosswise of said illuminant to the field of view of the display so formed, and means to shift said refractors relative to each other eccentrically around an axial point embraced by said design.

2. The combination of a plurality of elongated illuminants formed at least partially in the outline of a circuitous design with a pair of refractors positioned one in front of the other in front of said illuminants and having each a plurality of refracting formations extending generally in the direction of said illuminants and spaced and contoured so that they combine optically to project beams of narrow divergence crosswise of said illuminants to the field of view of the display so formed, and means to shift one of said refractors relative to the other eccentrically around an axial point embraced by said design.

3. The combination of a plurality of elongated illuminants of spectrally contrasting light emission formed at least partially in the outline of a circuitous design with a pair of refractors positioned one in front of the other in front of said illuminants and having each a plurality of refracting formations extending generally in the direction of said illuminants and spaced and contoured so that they combine optically to project beams of narrow divergence crosswise of said illuminants to the field of view of the display so formed, and means to shift one of said refractors relative to the other eccentrically around an axial point embraced by said design.

4. The combination of a long and narrow illuminant with a pair of refractors positioned one in front of the other in front of said illuminant and having each a plurality of adjacently disposed, coextensive, elongated lenses in bank formation with their major axes of refraction extending in the general direction of said illuminant, the cross sectional contour of which lenses with respect to their index of refraction and the spacing of said refractors from each other and said illuminant being so determined that a lens of either refractor combines, when in optical alignment with a lens of the other refractor and said illuminant, to form therewith an elemental optical system of the device projective to the field of view of an elemental beam of narrow divergence crosswise of said illuminant, the spacing of said lenses crosswise of said illuminant in the lens banks being so determined that, for each of a number of different positions of said refractors relative to each other crosswise of said illuminant within the restrictions above stated, a plurality of such elemental optical systems are formed projective in the aggregate of one or more compound beams of narrow divergence crosswise of said illuminant in different directions to the field of view around the axis of said illuminant, the angle of any such compound beam to the field of view around the illuminant axis varying from point to point along said illuminant when the lenses of one of said refractors are at a slant to the lenses of the other, and means to move one of said refractors relative to the other back and forth across the illuminant with the lenses thereof at an opposite slant to the lenses of the other for each opposite movement whereby to sweep the field of view with such compound beams in such order that an observer therein is covered by beams from successive points along said illuminant in one direction for both said opposite movements.

5. The combination of a long and narrow illuminant in the form of a design with a pair of refractors positioned one in front of the other in front of said illuminant and having each a plurality of adjacently disposed, coextensive, elongated lenses in bank formation characteristic of said design with the lenses in each bank extending in the general direction of said illuminant from place to place therealong, the cross sectional contour of which lenses with respect to their index of refraction and the spacing of said refractors from each other and said illuminant being so determined that a lense of either refractor combines, when in optical alignment with a lens of the other refractor and said illuminant, to form therewith an elemental optical system of the device projective to the field of view of an elemental beam of narrow divergence crosswise of said illuminant, the spacing of said lenses crosswise of said illuminant in the lens banks being so determined that, for each of a number of different positions of said refractors relative to each other crosswise of said illuminant at any point therealong within the restrictions above stated, a plurality of such elemental optical systems are formed projective in the aggregate of one or more compound beams of narrow divergence crosswise of said illuminant in different directions to the field of view around the axis of said illuminant thereat, and means to shift one of said major elements relative to the others through a succession of such positions in different directions while maintaining the spacing above recited to variously sweep the field of view with beams from various parts of said illuminant.

6. The combination of a long and narrow illuminant in the form of a design in which various portions of said illuminant extend in various different directions in its plane with a pair of refractors positioned one in front of the other in front of said illuminant and having each a plurality of adjacently disposed, coextensive, elongated lenses in bank formation characteristic of said design with the lenses in each bank extending in the general direction of said illuminant from place to place therealong, the cross sectional contour of which lenses with respect to their index of refraction and the spacing of said refractors from each other and said illuminant being so determined that a lense of either refractor combines, when in optical alignment with a lens of the other refractor and said illuminant, to form therewith an elemental optical system of the device projective to the field of view of an elemental beam of narrow divergence crosswise of said illuminant, the spacing of said lenses crosswise of said illuminant in the lens banks being so determined that, for each of a number of different positions of said refractors relative to each other crosswise of said illuminant at any point therealong within the restriction above stated, a plurality of such elemental optical systems are formed projective in the aggregate of one or more compound beams of narrow divergence crosswise of said illuminant in different directions to the field of view around the axis of said illuminant thereat, and means to shift one of said refractors relative to the other successively in one direction after another to variously traverse the lenses thereof across the lenses of the other crosswise of said illuminant at different points therealong and thereby sweep the field of view with such compound beams from different parts of said illuminant in such order that an observer therein will see an animation effect along the outline of said illuminant in accordance with the changing coverage of his position by beams from different parts thereof.

FRED HOTCHNER.